(12) United States Patent
Kim et al.

(10) Patent No.: US 11,182,926 B2
(45) Date of Patent: Nov. 23, 2021

(54) SYSTEM AND METHOD OF RECOGNIZING COLLISION POSITION OF SCREEN

(71) Applicant: ELECTRONICS AND TELECOMMUNICATIONS RESEARCH INSTITUTE, Daejeon (KR)

(72) Inventors: Jong Sung Kim, Daejeon (KR); Myung Gyu Kim, Daejeon (KR); Woo Suk Kim, Daejeon (KR); Seong Min Baek, Daejeon (KR); Sang Woo Seo, Daejeon (KR); Sung Jin Hong, Incheon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 77 days.

(21) Appl. No.: 16/738,802

(22) Filed: Jan. 9, 2020

(65) Prior Publication Data

US 2020/0226784 A1 Jul. 16, 2020

(30) Foreign Application Priority Data

Jan. 11, 2019 (KR) .......................... 10-2019-0004006

(51) Int. Cl.
*G06T 7/73* (2017.01)
*G06T 7/246* (2017.01)

(52) U.S. Cl.
CPC ............... *G06T 7/74* (2017.01); *G06T 7/248* (2017.01); *G06T 2207/10048* (2013.01); *G06T 2207/30221* (2013.01)

(58) Field of Classification Search
CPC .......... G06T 7/20; G06T 7/246; G06T 7/248; G06T 7/30; G06T 7/70; G06T 7/73;
(Continued)

(56) References Cited

U.S. PATENT DOCUMENTS

| 8,199,199 B1 * | 6/2012 | Shlyak et al. ..... A63B 71/0605 348/157 |
| 9,036,864 B2 | 5/2015 | Johnson et al. |

(Continued)

FOREIGN PATENT DOCUMENTS

| KR | 100967553 B1 | 7/2010 |
| KR | 20110027929 A | 3/2011 |

(Continued)

OTHER PUBLICATIONS

Zhou, et al., "Tennis Ball Tracking Using a Two-Layered Data Association Approach," IEEE Transactions On Multimedia, Feb. 2015, pp. 145-156, vol. 17 (2).

*Primary Examiner* — Andrew W Johns (57) ABSTRACT

A system for recognizing collision positions of a plurality of moving objects in a screen includes an infrared camera configured to obtain an image frame when a plurality of moving objects move toward a screen, a memory configured to store a program for calculating a collision position in the screen on the basis of the image frame, and a processor configured to execute the program stored in the memory. By executing the program, the processor detects all of the plurality of moving objects from the image frame to generate a graph where moving objects included in a successive image frame are connected to one another, and calculates a collision position of the moving object included in the image frame and a collision position of the moving object in the screen on the basis of the graph.

17 Claims, 10 Drawing Sheets

(58) Field of Classification Search
CPC ... G06T 7/74; G06T 7/97; G06T 2207/20072;
G06T 2207/30241; G06T 2207/30244;
G06K 2009/00738; G06K 9/469; G06K
9/6215; G06K 9/6296; G06K 2209/21;
A63B 63/00; A63B 69/0097; A63B
2214/00; A63B 2220/05; A63B 2220/805;
A63B 2220/806; A63B 2220/807
See application file for complete search history.

(56) References Cited

U.S. PATENT DOCUMENTS

| | | |
|---|---|---|
| 9,972,091 B2 | 5/2018 | Lee et al. |
| 2016/0180532 A1* | 6/2016 | Katramados et al. ........................ G06K 9/4661 382/103 |
| 2018/0043229 A1* | 2/2018 | Stemle .................. G06T 7/11 |
| 2019/0015699 A1* | 1/2019 | Joo et al. ............ A63B 69/0002 |
| 2019/0083875 A1* | 3/2019 | Guerci et al. ....... A63B 24/0062 |
| 2020/0206597 A1* | 7/2020 | Lee et al. .................. G09B 5/06 |
| 2021/0102781 A1* | 4/2021 | Lee et al. .................. G06T 7/70 |

FOREIGN PATENT DOCUMENTS

| | | |
|---|---|---|
| KR | 101594740 B1 | 2/2016 |
| KR | 101637143 B1 | 7/2016 |

* cited by examiner

SYSTEM AND METHOD OF RECOGNIZING COLLISION POSITION OF SCREEN

CROSS-REFERENCE TO RELATED APPLICATIONS

This application claims priority under 35 U.S.C. § 119 to Korean Patent Application No. 10-2019-0004006, filed on Jan. 11, 2019, the disclosure of which is incorporated herein by reference in its entirety.

TECHNICAL FIELD

The present invention relates to a system and method of recognizing a collision position of a screen, and more particularly, to a system and method of recognizing collision positions at which a plurality of moving objects collide with a screen, based on an infrared camera.

BACKGROUND

In playable or educational sports content platform of a virtual target game type, a user in front of a screen may experience a virtual target game which throws, kicks, or hits a moving object such as a baseball, a soccer ball, or a basketball with a hand, a foot, or a tool to hit a virtual target of the screen.

In order to experience the virtual target game, a user should precisely recognize in real time a position at which a moving object thrown, kicked, or hit by the user collides with a screen actually.

Moreover, in order for a plurality of users to simultaneously experience the virtual target game, the users should recognize screen collision positions of a plurality of simultaneously thrown, kicked, or hit moving objects.

Generally, an optical film sensor array method may be used for recognizing a screen collision position of a moving object. In the optical film sensor array method, light emitting sensors of a light emitting sensor array are installed in one row in a frame fixing a screen to form an optical film on the screen, and when a moving object thrown or hit by a user collides with a screen, a light receiving sensor array senses light which is reflected from the moving object at a collision position at which the moving object contacts the screen, thereby recognizing the collision position.

Moreover, a vibration sensor array method may be used for recognizing a screen collision position of a moving object. In the vibration sensor array method, a vibration sensor array is directly connected to a screen and senses a screen vibration signal which is generated when a moving object collides with the screen, thereby sensing a screen collision position of the moving object.

However, in the method which uses the light emitting sensor array and the light receiving sensor array, there is a limitation where it is possible to recognize a screen collision position only when a plurality of light emitting sensors and light receiving sensor are accurately aligned and installed in one row in a frame.

Moreover, in the method which uses the vibration sensor array, there is a limitation where a plurality of vibration sensors should be directly connected to a screen, and there is a limitation where it is possible to recognize a screen collision only in a case where a sufficient vibration signal is generated when a moving object collides with a screen.

Moreover, the sensor array method has a limitation where it is unable to recognize screen collisions of a plurality of moving objects simultaneously thrown, kicked, or hit by a plurality of users.

SUMMARY

Accordingly, the present invention provides a system and method of recognizing a collision position of a screen, which recognize a collision position of a screen when a plurality of moving objects simultaneously move in front of the screen, based on an infrared camera.

The objects of the present invention are not limited to the aforesaid, but other objects not described herein will be clearly understood by those skilled in the art from descriptions below.

In one general aspect, a screen collision position recognizing method, performed by a screen collision position recognizing system, includes: obtaining, by an infrared camera, an image frame when a plurality of moving objects move toward a screen; detecting the moving object from the image frame; calculating a collision position of the detected moving object in the image frame; and calculating a collision position of the detected moving object in the screen on the basis of the calculated collision position of the detected moving object in the image frame.

In an embodiment, the detecting of the moving object may include detecting all moving objects included in a plurality of image frames obtained through photographing performed for a continuous time.

In an embodiment, the detecting of the moving object may include generating a graph where a moving object included in a current image frame is connected to a moving object included in a next image frame, based on all of the moving objects included in the plurality of image frames.

In an embodiment, the graph may include a node set corresponding to a motion position of a moving object included in the image frame and an edge set where moving objects included in an image frame adjacent to the image frame are connected to one another.

In an embodiment, the generating of the graph may include calculating a value of an edge, representing a connection or not of a node corresponding to a motion position of a moving object included in the current image frame and a node corresponding to a motion position of a moving object included in the next image frame, from the edge set.

In an embodiment, the generating of the graph may include: calculating a cost function which is proportional to a geometric distance between the node of the current frame image and the node of the next frame image and is proportional to a photometric distance between the nodes; selecting nodes where the calculated cost function is minimum in a bi-direction in association with a previous image frame and a next image frame with respect to a current image frame; and connecting the selected nodes to generate the graph.

The screen collision position recognizing method according to an embodiment of the present invention may further include generating and storing a track list based on the connected nodes, wherein the motion track list may include a motion position array corresponding to a moving object which is continuously traced from the plurality of image frames, and the motion position array may be generated by units of moving objects.

The screen collision position recognizing method according to an embodiment of the present invention may further include tracing a state of the moving object.

In an embodiment, a state of the moving object may be determined as one of a stop state, a start state, a forward motion state, a collision state, and a backward motion state of the moving object on the basis of a value of a motion function including a sign and a distance between motion positions of the moving object.

In an embodiment, the calculating of the collision motion of the detected moving object may include determining, as the collision position, a motion position in the image frame when the state of the moving object is the collision state.

In an embodiment, the calculating of the collision motion of the detected moving object may include calculating a collision position in the screen on the basis of a homographic function representing a plane-to-plane projection relationship in the image frame and the screen.

The screen collision position recognizing method according to an embodiment of the present invention may further include, when the state of the moving object is the collision state or the stop state, ending a process of tracing the moving object.

In another general aspect, a system for recognizing collision positions of a plurality of moving objects in a screen includes: an infrared camera configured to obtain an image frame when a plurality of moving objects move toward a screen; a memory configured to store a program for calculating a collision position in the screen on the basis of the image frame; and a processor configured to execute the program stored in the memory. Here, by executing the program, the processor may detect all of the plurality of moving objects from the image frame to generate a graph where moving objects included in a successive image frame are connected to one another and may calculate a collision position of the moving object included in the image frame and a collision position of the moving object in the screen on the basis of the graph.

In an embodiment, the processor may calculate a value of an edge, representing a connection or not of nodes corresponding to motion positions of the moving objects included in the successive image frame.

In an embodiment, the processor may calculate a cost function which is proportional to a geometric distance between the nodes of the successive frame image and is proportional to a photometric distance between the nodes, select nodes where the calculated cost function is minimum in a bi-direction in association with the successive image frame, and connect the selected nodes to generate the graph.

In an embodiment, the processor may generate and store a track list based on the connected nodes. Here, the track list may include a motion position array corresponding to a moving object which is continuously traced from the plurality of image frames, and the motion position array may be generated by units of moving objects.

In an embodiment, the processor may determine a state of the moving object as one of a stop state, a start state, a forward motion state, a collision state, and a backward motion state of the moving object on the basis of a value of a motion function including a sign and a distance between motion positions of the moving object.

In an embodiment, the processor may determine, as the collision position, a motion position in the image frame when the state of the moving object is the collision state and calculates a collision position in the screen on the basis of a homographic function representing a plane-to-plane projection relationship in the image frame and the screen.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity. Like reference numerals refer to like elements throughout.

In this disclosure below, when it is described that one comprises (or includes or has) some elements, it should be understood that it may comprise (or include or has) only those elements, or it may comprise (or include or have) other elements as well as those elements if there is no specific limitation.

The present invention relates to a system 100 and method of recognizing collision positions at which a plurality of moving objects collide with a screen, based on an infrared camera 110.

The present invention may be applied to playable and educational sports content platform in which one user simultaneously moves a plurality of moving objects or a plurality of users simultaneously move a plurality of moving objects in front of a screen, and thus, hit(s) a virtual target of the screen or reach(s) a target point of the screen.

Therefore, according to the present invention, positions at which a plurality of moving objects collide with a screen may be precisely recognized in real time by using one infrared camera without using a separate sensor array.

In this case, according to an embodiment of the present invention, a moving object may be a baseball, a soccer ball, or a basketball, and moreover, may include all objects such as an arrow, a bullet, and other things capable of being moved by a user or a force of a machine manipulated by the user, in addition to having a ball shape.

Moreover, in an embodiment of the present invention, only one infrared camera may be fundamentally used, but the present invention may be used. Depending on the case, a plurality of infrared cameras may be simultaneously used.

Hereinafter, a screen collision position recognizing system according to an embodiment of the present invention will be described with reference to FIG. 1.

Figure 1:
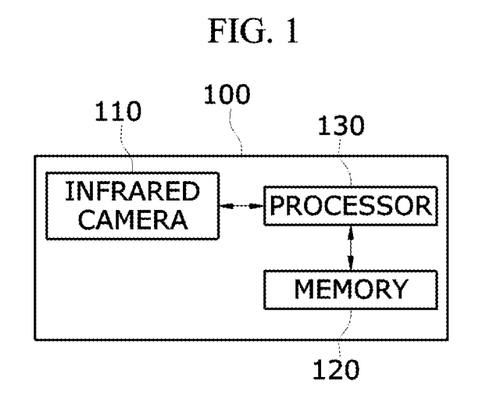
FIG. 1 is a block diagram of a screen collision position recognizing system according to an embodiment of the present invention.
Figure 2A:
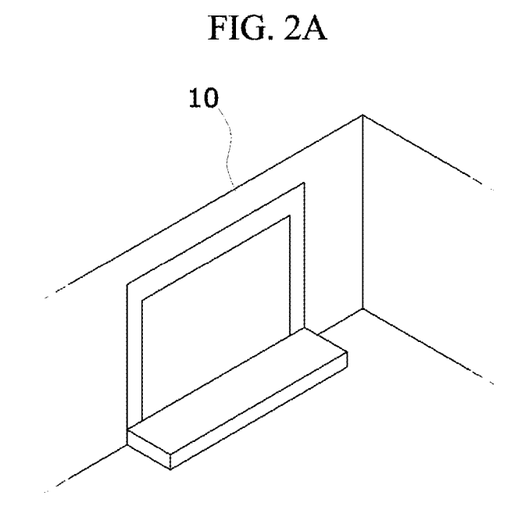
FIGS. 2A and 2B are diagrams illustrating an example of a screen and an infrared camera.
Figure 2B:
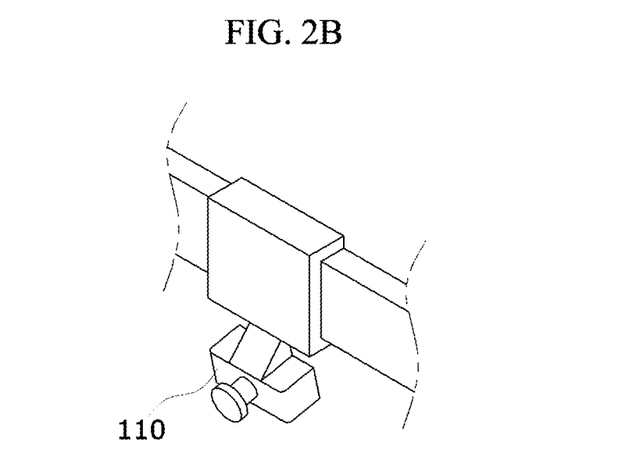

FIG. 1 is a block diagram of a screen collision position recognizing system 100 according to an embodiment of the present invention. FIGS. 2A and 2B are diagrams illustrating an example of a screen and an infrared camera.

The screen collision position recognizing system 100 according to an embodiment of the present invention may include an infrared camera 110, a memory 120, and a processor 130.

The infrared camera 110 may obtain an image frame 30 when a plurality of moving objects 20 moves toward a screen 10. The infrared camera 110 may be installed at a position for obtaining, as an image frame 30, a series of processes until the moving objects 20 collide with the screen 10 at points at which one user or a plurality of users move(s) a plurality of moving objects 20.

The memory 120 may store a program for calculating a collision position of the screen 10 on the basis of the image frame 30 captured by the infrared camera 110. In this case, the memory 120 may be a generic name for a non-volatile memory device and a volatile memory device which continuously maintain information stored therein even when power is not supplied thereto.

Examples of the memory 120 may include NAND flash memory such as compact flash (CF) card, secure digital (SD) card, memory stick, solid state drive (SSD), and micro SD card, magnetic computer memory device such as hard disk drive (HDD), and optical disc drive such as CD-ROM and DVD-ROM.

The processor 130 may execute the program stored in the memory 120 to detect all of the plurality of moving objects 20 from the image frame 30, generate a graph G where the moving objects 20 included in the image frame 30 are connected to one another, and calculate the moving objects 20 included in the image frame 30 and a collision position of each of the moving objects 20 in the screen 10 on the basis of the graph G.

For reference, the elements according to an embodiment of the present invention illustrated in FIG. 1 may be implemented as software or a hardware type such as field programmable gate array (FPGA) or application specific integrated circuit (ASIC) and may perform certain functions.

However, "elements" are not meanings limited to software or hardware, and each element may be configured to reside in an addressable storage medium and configured to execute on one or more processors.

Thus, an element may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The functionality provided for in the components and modules may be combined into fewer components and modules or further separated into additional components and modules.

Hereinafter, a method performed by the screen collision position recognizing system 100 according to an embodiment of the present invention will be described in more detail with reference to FIGS. 3 to 11.

Figure 3:
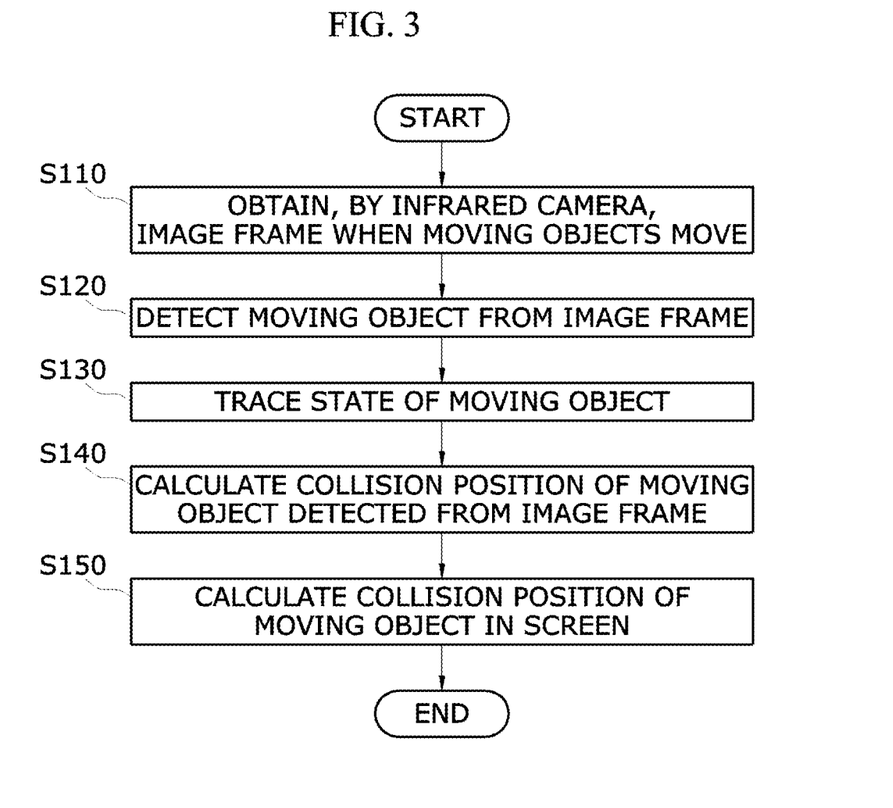
FIG. 3 is a flowchart of a screen collision position recognizing method according to an embodiment of the present invention.
Figure 4:
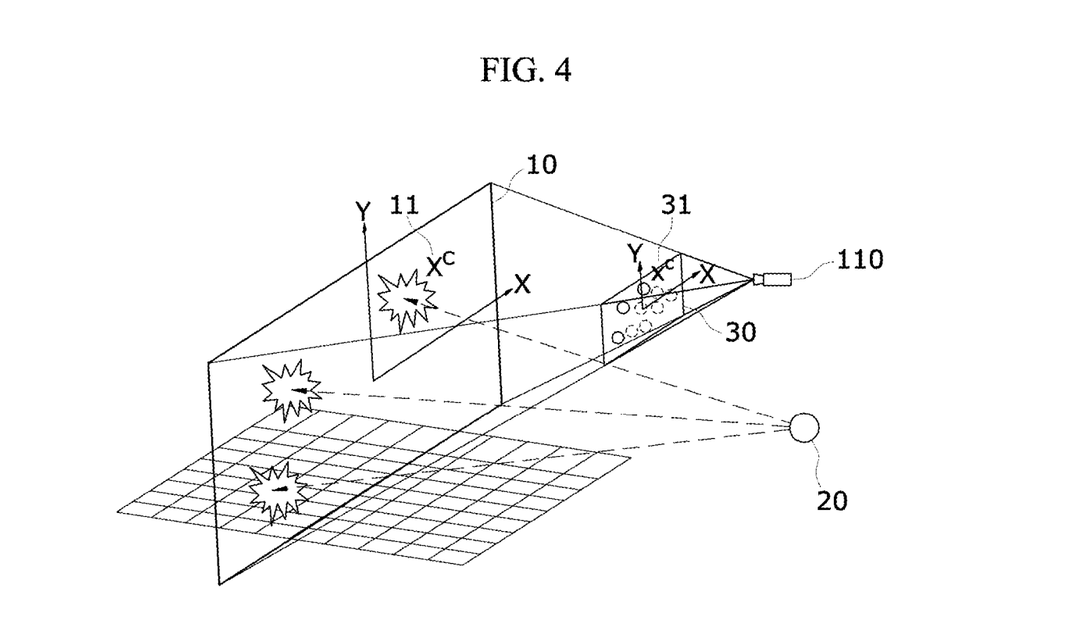
FIG. 4 is a diagram for describing collision positions of a plurality of moving objects in an embodiment of the present invention.
Figure 5A:
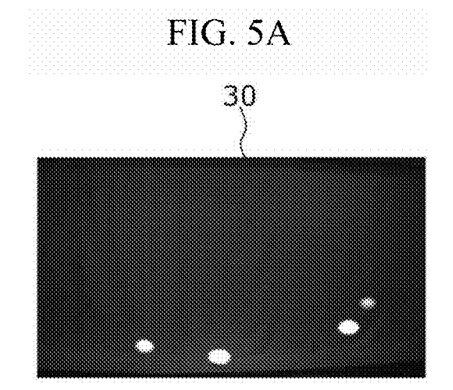
FIGS. 5A and 5B are diagrams illustrating an example of an image frame obtained by an infrared camera.
Figure 5B:
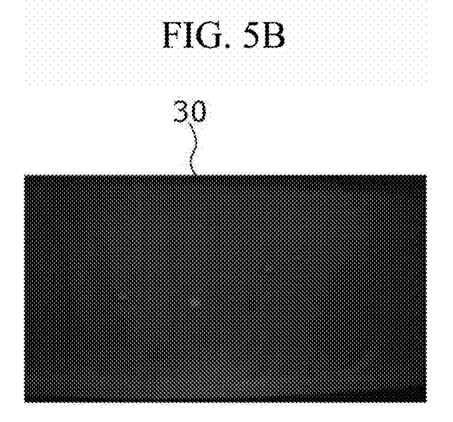

FIG. 3 is a flowchart of a screen collision position recognizing method according to an embodiment of the present invention. FIG. 4 is a diagram for describing collision positions of a plurality of moving objects 20 in an embodiment of the present invention. FIGS. 5A and 5B are diagrams illustrating an example of an image frame obtained by an infrared camera 110.

In an embodiment of the present invention, one user or a plurality of users in front of a screen 10 may simultaneously throw, kick, or hit a plurality of moving objects 20, and a collision position "$x^C$" 11 of a screen coordinate system and a collision position "$x^C$" 31 of an image frame 30 corresponding to the thrown, kicked, or hit moving objects may be calculated.

In this case, in an embodiment of the present invention, the image frame "F" 30 of the moving objects 20 obtained in real time through the one infrared camera 110 may be precisely recognized in real time by tracing a position and a state of each of the moving objects 20 on the basis of a graph G.

To this end, in an embodiment of the present invention, the image frame 30 of the plurality of moving objects 20 which are moving toward the screen 10 may be obtained by the infrared camera 110 in step S110.

According to an embodiment of the present invention, in order to solve problems such as the brightness and color variation of content projected onto a screen and a problem such as a change in an external illumination environment in camera-based screen collision position recognition technology, a visible light range may be blocked, and the image frame 30 needed for recognizing collision positions between a plurality of moving objects and a screen may be obtained by the infrared camera 110 reacting on only an infrared range.

An example of the image frame 30, obtained by the one infrared camera 110 in real time, of the plurality of moving objects 20 thrown by a user in front of the screen 20 with real content projected thereon is as illustrated in FIGS. 5A and 5B.

When the image frame 30 is obtained by the infrared camera 110, the moving objects 20 may be detected from the obtained image frame 30 in step S120.

Figure 6:
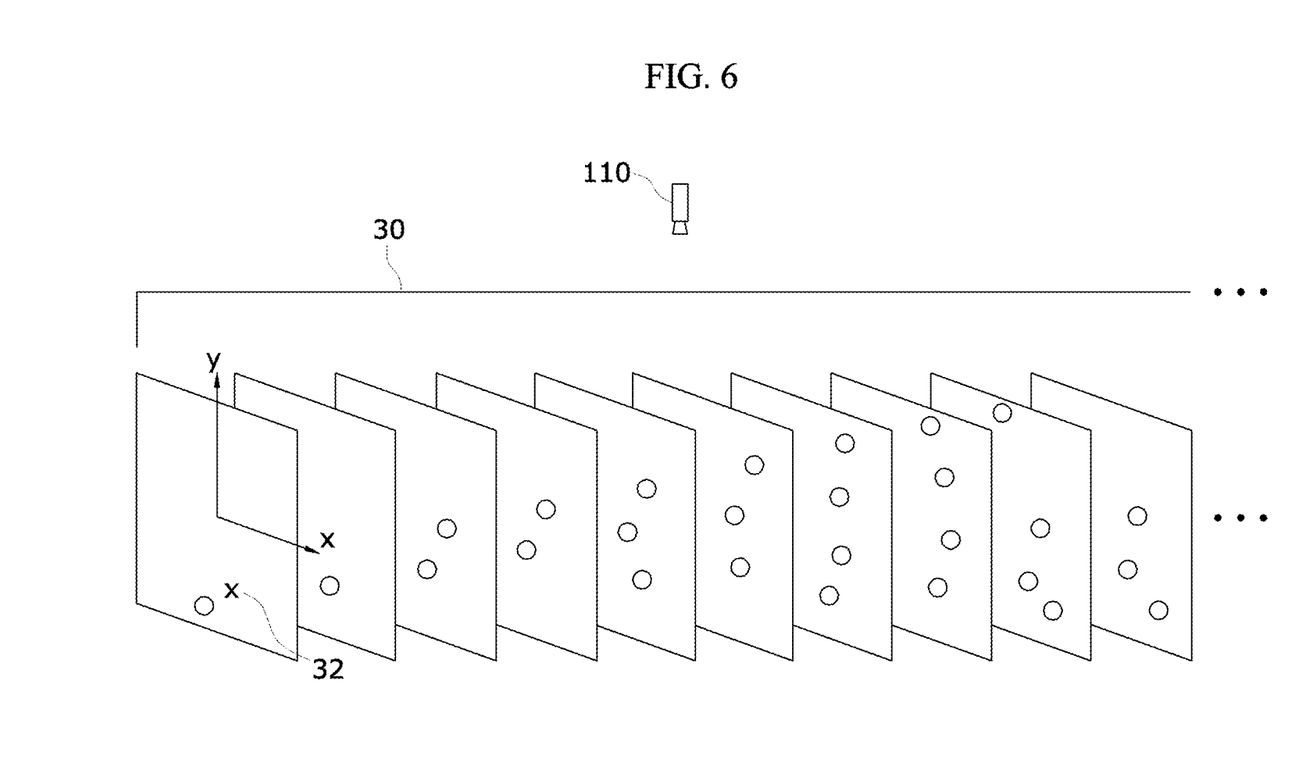
FIG. 6 is a diagram for describing a process of detecting a moving object from an image frame.

FIG. 6 is a diagram for describing a process of detecting a moving object 20 from an image frame 30.

Referring to FIG. 6, in an embodiment of the present invention, in order to process all of a plurality of moving objects 20 thrown, kicked, or hit by a user, the plurality of moving objects 20 may be simultaneously detected from the image frame 30 which is obtained by an infrared camera 110 in real time and includes a moving object, without a number being limited.

That is, in an embodiment of the present invention, all of moving objects 20 included in a plurality of image frames 30 captured and obtained for a continuous time may be detected.

In this case, in an embodiment of the present invention, circular Hough transform or random sample Sonsensus-based ball detection technique may be used for detecting a position of a moving object such as a baseball, a soccer ball, or a basketball from the image frame 30.

In an embodiment of the present invention, based on the ball detection technique, a position 32 of each of a plurality of moving objects may be detected, and a motion position "x" 32 may be precisely recognized in a current image frame 30 in real time.

However, whether the position 32 recognized in a moving object detection step is a collision position 31 of a corresponding moving object 20 may not be determined. Accordingly, in an embodiment of the present invention, the collision position 31 of the moving object 20 may be accurately checked by additionally performing a process of tracing a position and a state of each of a plurality of moving objects based on a below-described graph.

Figure 7:
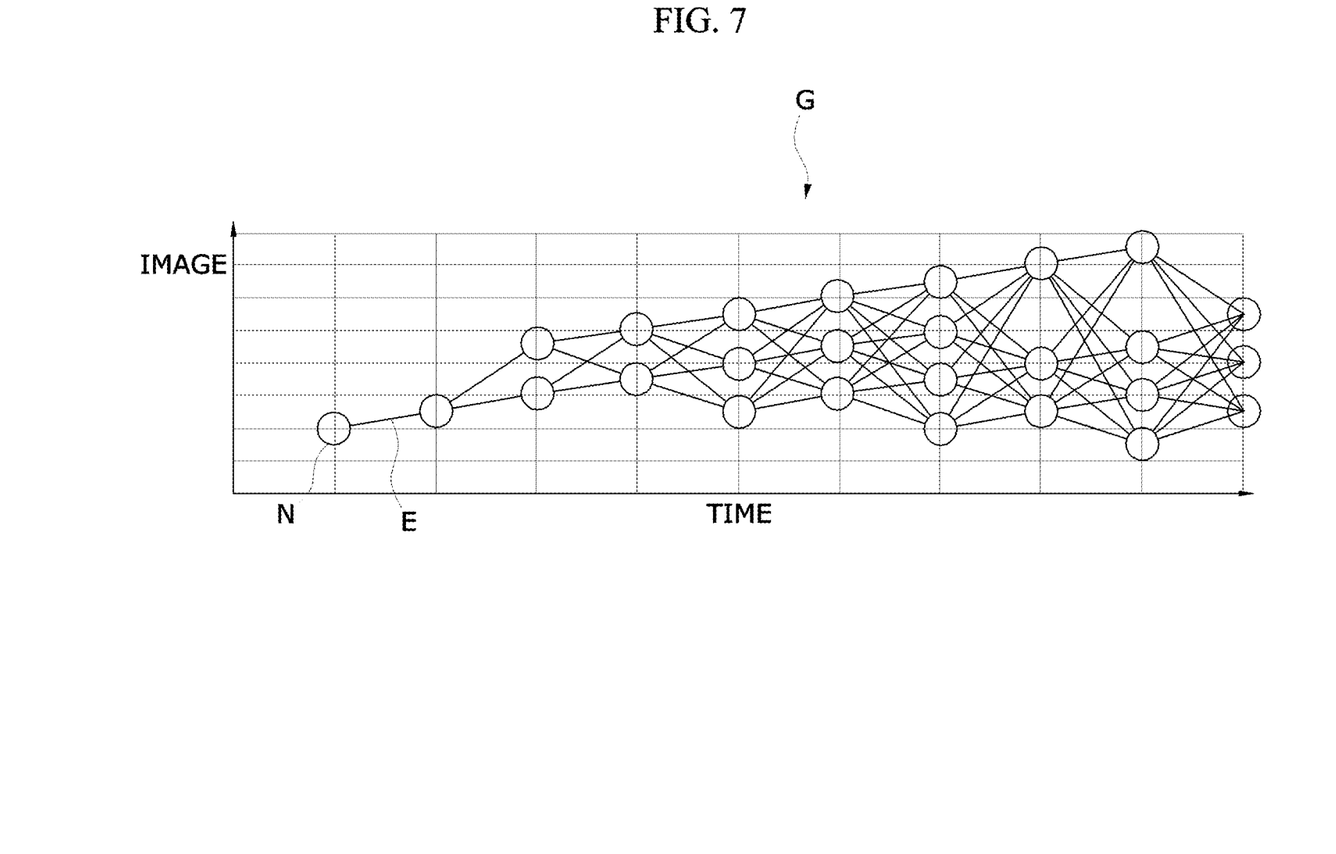
FIG. 7 is a diagram illustrating an example of a graph showing a position of a moving object.

FIG. 7 is a diagram illustrating an example of a graph showing a position of a moving object.

In an embodiment of the present invention, in order to precisely trace in real time all motion positions of a plurality of moving objects detected by detecting a position 32 of a moving object from an image frame 30 obtained in real time by an infrared camera 110, a graph G shown in FIG. 7 may be continuously generated based on all motion positions 32 of a plurality of moving objects detected by detecting positions of moving objects.

That is, the graph G may be generated by connecting a moving object, included in a current image frame, to a moving object included in a next image frame on the basis of all moving objects 32 detected from a plurality of image frames 30.

In this case, the graph G generated for tracing positions of a plurality of moving objects may include a node set "N" consisting of a node "n" corresponding to a motion position "x" 32 of a moving object included in the image frame 30 and an edge "e" expressing the connection or not of nodes corresponding to a motion position 32 of a moving object included in an image frame adjacent to the image frame as in the following Equation (1).

$$G=\{N,E\} \qquad \text{[Equation 1]}$$

Here, a node set "N" may include a node subset "$N_t$" when a time is t as in the following Equation (2).

$$N=\{N^t | t \in [1,T]\} \qquad \text{[Equation 2]}$$

Moreover, an edge set "E" may include an edge subset "$E^t$" when a time is t as in the following Equation (3).

$$E=\{E^t | t \in [1,T-1]\} \qquad \text{[Equation 3]}$$

For example, when P (where P is an integer of 2 or more) number of moving objects are detected from an image frame "$F_t$" corresponding to a case where a time is t through a moving object detection step, the node subset "$N^t$" when a time is t may include P number of nodes as in the following Equation (4).

$$N^t=\{n_t^P | p \in [1,P]\} \qquad \text{[Equation 4]}$$

Moreover, when Q (where Q is an integer of 2 or more) number of moving objects are detected from an image frame "$F_{t+1}$" corresponding to a case where a time is t+1 through a moving object detection step, a node subset "$N^{t+1}$" when a time is t+1 may include Q number of nodes as in the following Equation (5).

$$N^{t+1}=\{n_q^{t+1} | q \in [1,Q]\} \qquad \text{[Equation 5]}$$

Moreover, an edge subset "$E^t$" where the image frame "$F_t$" corresponding to a time "t" is connected to the image frame "$F_{t+1}$" corresponding to a time "t+1" may include P×Q number of edges as in the following Equation (6).

$$Et=\{e(n_p^t, n_q^{t+1}) | p \times q \in [1,P] \times [1,Q]\} \qquad \text{[Equation 6]}$$

Subsequently, in an embodiment of the present invention, a value of an edge representing the connection or not of a plurality of moving objects detected from among the image frame "$F_t$" and the image frame "$F_{t+1}$" respectively corresponding to a time "t" and a time "t+1" may be calculated as expressed in the following Equation (7).

$$e(n_p^t, n_q^{t+1}) = \begin{cases} 1 & \text{if } q = \min_{o \in [1,Q]} A(n_p^t, n_o^{t+1}) \text{ and } p = \min_{o \in [1,P]} A(n_o^t, n_q^{t+1}) \\ 0 & \text{otherwise} \end{cases} \qquad \text{[Equation 7]}$$

Here, a case where the value of the edge is 1 may denote a connection, and a case where the value of the edge is 0 may denote a non-connection.

In Equation (7), a cost function "$A(n_p^t, n_q^{t+1})$" where $n_p^t$ is connected to $n_q^{t+1}$ may be calculated as in the following Equation (8).

$$A(n_p^t, n_q^{t+1}) = \frac{D(n_p^t, n_q^{t+1})}{W(n_p^t, n_q^{t+1})} \qquad \text{[Equation 8]}$$

In Equation (8), $D(n_p^t, n_q^{t+1})$ may denote a distance function proportional to a geometric distance between nodes, and $W(n_p^t, n_q^{t+1})$ may denote a similarity function proportional to a photometric distance between the nodes.

Figure 8:
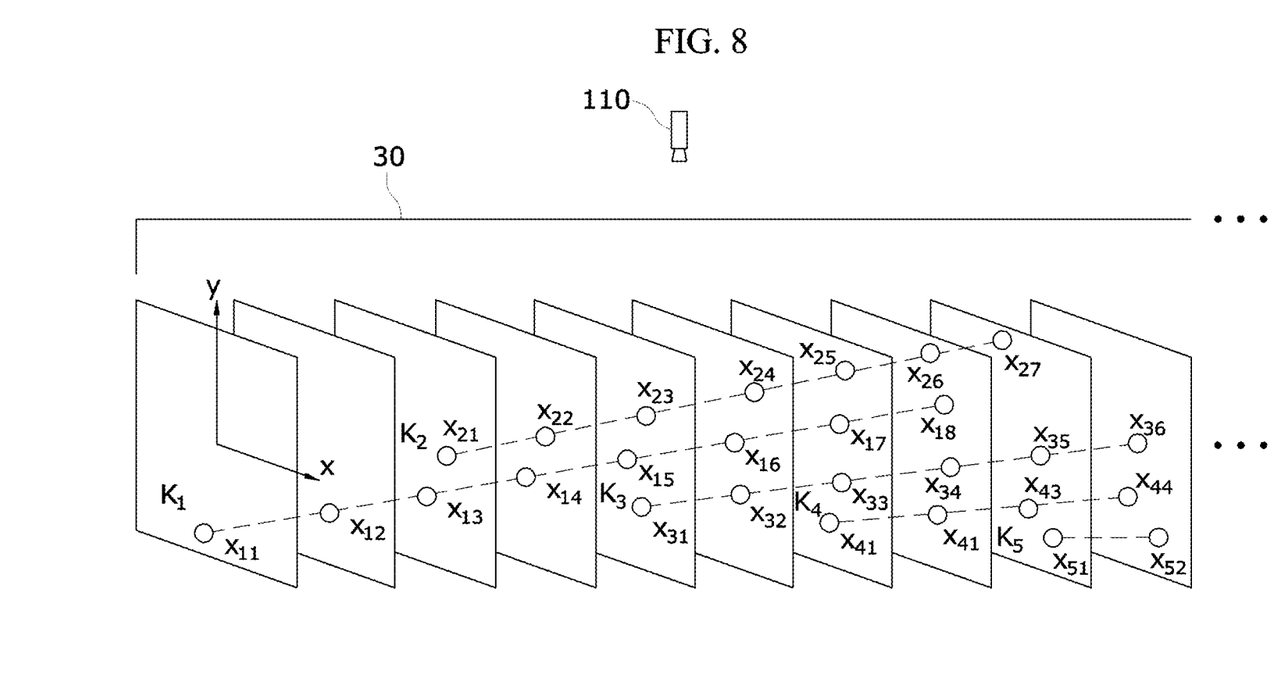
FIG. 8 is a diagram illustrating an example where a position of a moving object traced in an image frame is expressed as a node and an edge.

As described above, in an embodiment of the present invention, when a cost function which is proportional to a geometric distance between a node of a current frame image and a node of a next frame image and is proportional to a photometric distance between the nodes is calculated, nodes where the calculated cost function is minimum in a bi-direction in association with a previous image frame and a next image frame with respect to a current image frame may be selected, and a graph shown in FIG. 8 may be generated by connecting the selected nodes.

FIG. 8 is a diagram illustrating an example where a position of a moving object traced in an image frame 30 is expressed as a node and an edge.

That is, as in FIG. 8, positions of a plurality of moving objects may be precisely traced in real time by connecting nodes, where a cost function is minimum in a bi-direction as in FIGS. 7 and 8, among $n_p^t$ and $n_q^{t+1}$ corresponding to motion positions of a plurality of moving objects detected from the image frame "$F_t$" and the image frame "$F_{t+1}$" respectively corresponding to a time "t" and a time "t+1"

Here, as in FIG. 8, a $j^{th}$ (where j is an integer of 2 or more) motion position "$x_{ij}$" of an $i^{th}$ (where i is an integer of 2 or more) moving object traced by tracing positions of a plurality of moving objects based on a graph may be stored as a 2×1 vector as expressed in the following Equation (9).

$$x_{ij} = \begin{pmatrix} x_{ij} \\ y_{ij} \end{pmatrix} \qquad \text{[Equation 9]}$$

Moreover, in all image frames, when an $i^{th}$ moving object is continuously traced "J" (where J is an integer of 2 or more) times through a process of tracing positions of a plurality of moving objects based on a graph, a motion track "$K_i$" of the $i^{th}$ moving object may be stored as J number of motion position arrays 31 as in the following Equation (10) and FIG. 9.

Figure 9:
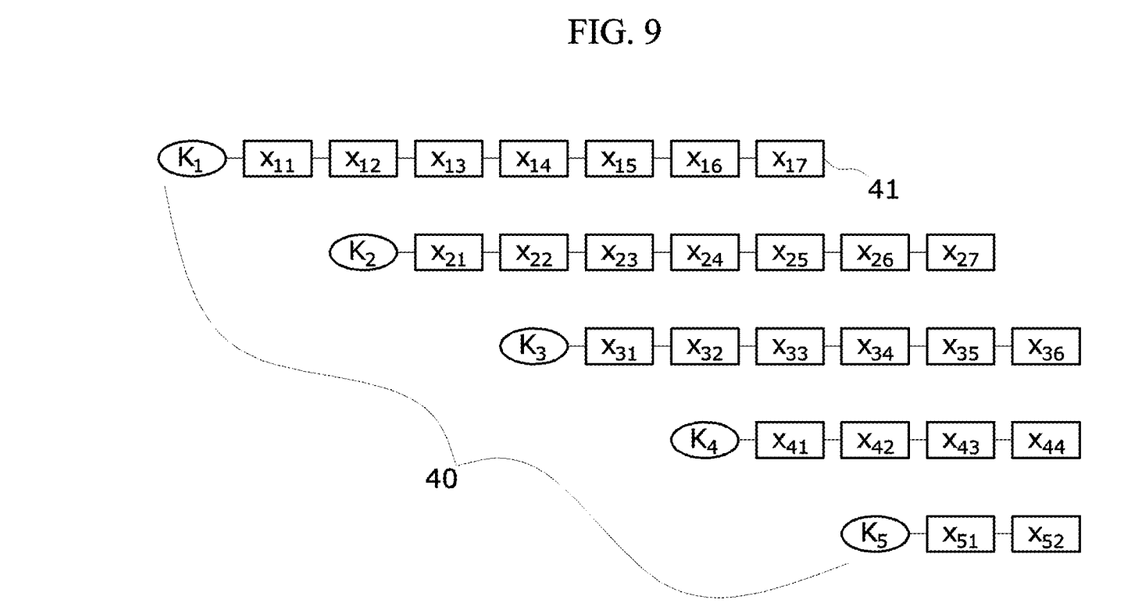
FIG. 9 is a diagram illustrating an example of a motion track list of a moving object.

FIG. 9 is a diagram illustrating an example of a motion track list 42 of a moving object.

$$K_i = \{x_{ij} | j \in [1, J]\} \quad \text{[Equation 10]}$$

In an embodiment of the present invention, nodes which are connected to one another as in FIG. 9 may be generated and stored as the motion track list 42.

In this case, the motion track list 42 may include a motion position array 41 corresponding to a moving object which is continuously traced from a plurality of image frames, and the motion position array 41 may be generated by units of moving objects.

That is, when I (where I is an integer of 2 or more) number of moving objects are traced in all image frames 30 through a process of tracing positions of a plurality of moving objects based on a graph, a motion track set "K" of the I moving objects may be stored as the motion track list 41 as in the following Equation (11) and FIG. 9.

$$K = \{K_i | i \in [1, I]\} \quad \text{[Equation 11]}$$

The screen collision position recognizing method according to an embodiment of the present invention may further include step (S130) of tracing a state of a moving object.

Figure 10:
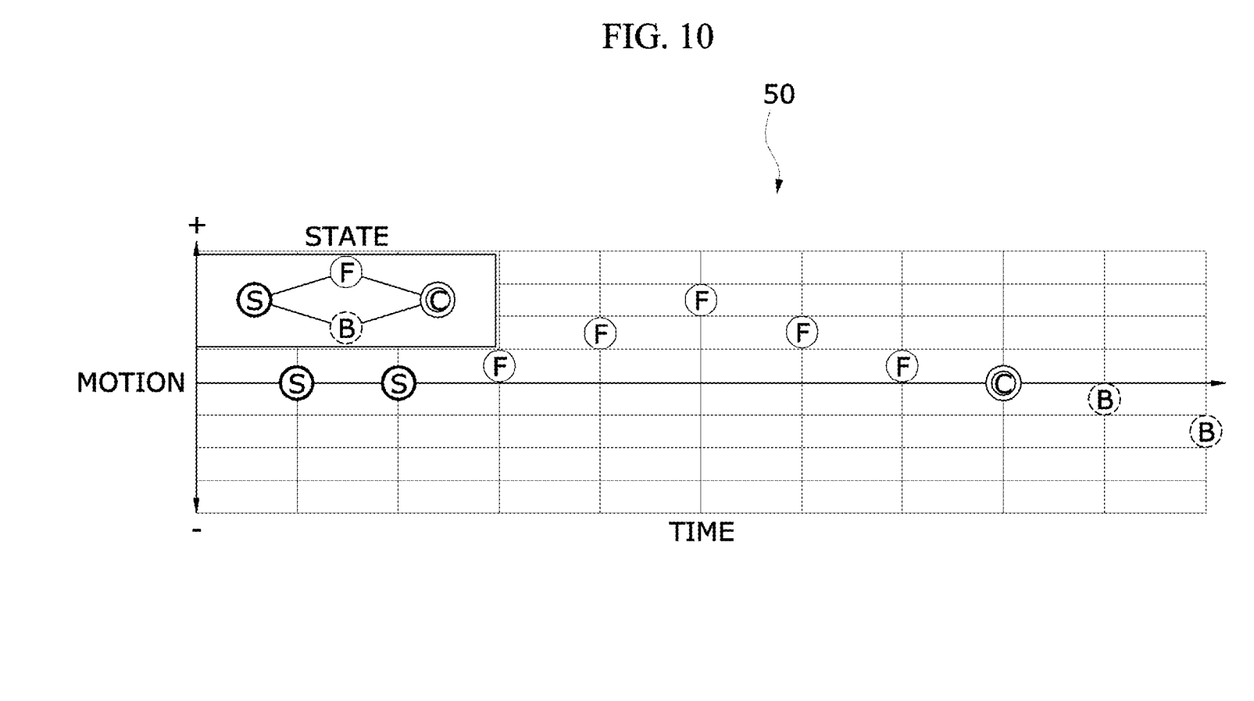
FIG. 10 is a diagram illustrating motion state information about a moving object.

FIG. 10 is a diagram illustrating motion state information about a moving object.

In an embodiment of the present invention, in a multi-object tracing process which is performed sequentially or simultaneously with a multi-object position tracing process based on a graph, a motion state "$U(x_{ij})$" of a moving object corresponding to a $j^{th}$ motion position "$x_{ij}$" of an $i^{th}$ moving object may be determined as in the following Equation (12) and FIG. 10 on the basis of a state of a $j-1^{th}$ motion position "$x_{ji-1}$".

$$U(x_{ij}) = \begin{cases} S & \text{if } j = 1 \text{ or } M(x_{ij-1}, x_{ij}) = 0 \\ F & \text{if } M(x_{ij-1}, x_{ij}) > 0 \\ C & \text{if } M(x_{ij-1}, x_{ij}) = 0 \text{ and } U(x_{ij-1}) = F \\ B & \text{if } M(x_{ij-1}, x_{ij}) < 0 \end{cases} \quad \text{[Equation 12]}$$

Here, S may denote a stop/start state of a moving object, F may denote a forward motion state of the moving object, C may denote a collision state of the moving object, and B may denote a backward motion of the moving object. Also, $M(x_{ij-1}, x_{ij})$ may denote a motion function and may be calculated as expressed in the following Equation (13).

$$M(x_{ij-1}, x_{ij}) = \text{sgn}(y_{ij-1} - y_{ij}) \times \|x\_(ij-1) - x\_ij\| \quad \text{[Equation 13]}$$

Figure 11:
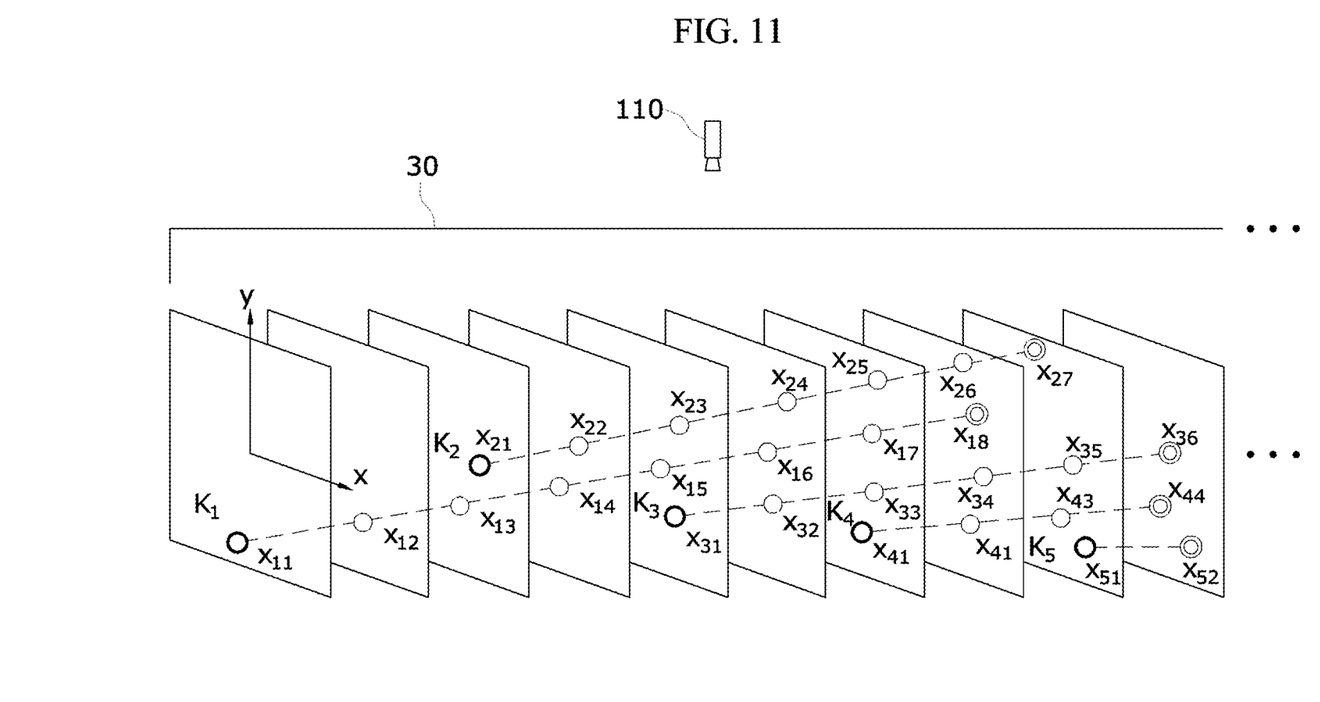
FIG. 11 is a diagram illustrating an example where state information and a position of a moving object are shown in a graph.

FIG. 11 is a diagram illustrating an example where state information and a position of a moving object are shown in a graph.

In an embodiment of the present invention, a moving object such as a baseball, a soccer ball, or a basketball thrown, kicked, or hit by a user in front of a screen 10 may be necessarily put in one state among S, F, C, and B, and thus, as in FIG. 11, positions and states of a plurality of moving objects may be precisely recognized by tracing the positions and states of the moving objects based on a graph.

Moreover, in an embodiment of the present invention, when a motion state of the moving object 20 is a collision state or a stop state, a process of tracing the moving object 20 may end. Also, by deleting a corresponding motion track from the motion track list 41, a process of tracing motion positions and states of a plurality of moving objects 20 may be continuously performed in real time in a limited storage capacity.

FIG. 11 illustrates an embodiment where tracing of a position and a state of the moving object 20 ends when a motion state of the moving object 20 is a collision state "$x_{27}$, $x_{36}$, $x_{44}$, and $x_{52}$".

Finally, in an embodiment of the present invention, a collision position "$x_i^C$" 31 of a moving object detected from an image frame 30 may be calculated as expressed in the following Equation (14) in step S140.

$$x_i^C = x_{ij} \text{ if } U(x_{ij}) = C \quad \text{[Equation 14]}$$

Moreover, in step S150, a collision position 11 of the moving object in the screen may be calculated based on the collision position 31 of an image frame.

In this case, in an embodiment of the present invention, the collision position "$x_i^C$" 31 in a screen coordinate system of an $i^{th}$ moving object may be calculated as expressed in the following Equation (15) by using a homographic function "H" representing a plane-to-plane projection relationship in the image frame and the screen.

$$X_i^C = \begin{pmatrix} X_i^C \\ Y_i^C \end{pmatrix} = H(x_i^C) = H\begin{pmatrix} x_i^C \\ y_i^C \end{pmatrix} = \begin{pmatrix} \dfrac{h_{11} x_i^C + h_{12} y_i^C + h_{13}}{h_{31} x_i^C + h_{32} y_i^C + h_{33}} \\ \dfrac{h_{21} x_i^C + h_{22} y_i^C + h_{23}}{h_{31} x_i^C + h_{32} y_i^C + h_{33}} \end{pmatrix} \quad \text{[Equation 15]}$$

Here, $h_{11}$, $h_{12}$, $h_{13}$, $h_{21}$, $h_{22}$, $h_{23}$, $h_{31}$, $h_{32}$, and $h_{33}$ may be factors of the homographic function "H" and may be previously calculated based on a two-dimensional (2D) calibration technique.

In the above description, steps S110 to S150 may be further divided into additional steps or may be combined into fewer steps depending on an implementation embodiment of the present invention. Also, some steps may be omitted depending on the case, and the order of steps may be changed. Furthermore, despite other omitted description, description given above in the screen collision position recognizing system 100 with reference to FIGS. 1, 2A and 2B may be applied to the screen collision position recognizing method illustrated FIGS. 3 to 11.

The method according to the embodiments of the present invention may be implemented in the form of a storage medium that includes computer executable instructions, such as program modules, being executed by a computer. Computer-readable media may be any available media that may be accessed by the computer and includes both volatile and nonvolatile media, removable and non-removable media. In addition, the computer-readable media may include computer storage media and communication media. Computer storage media includes both the volatile and non-volatile, removable and non-removable media implemented as any method or technology for storage of information such as computer readable instructions, data structures, program modules, or other data. The medium of communication is a typically computer-readable instruction, and other data in a modulated data signal such as data structures, or program modules, or other transport mechanism and includes any information delivery media.

The method and system 100 according to the embodiments of the present invention have been described in association with a specific embodiment, but their elements, some operations, or all operations may be implemented by using a computer system having general-use hardware architecture.

As described above, a physical size of a fiducial marker according to the embodiments of the present invention may be minimized, and moreover, ID bit information may be inserted into the fiducial marker as much as possible. Also, the fiducial marker according to the embodiments of the present invention may be robust to viewpoint distortion and may provide orientation information.

The foregoing description of the present invention is for illustrative purposes, those with ordinary skill in the technical field of the present invention pertains in other specific forms without changing the technical idea or essential features of the present invention that may be modified to be able to understand. Therefore, the embodiments described above, exemplary in all respects and must understand that it is not limited. For example, each component may be distributed and carried out has been described as a monolithic and describes the components that are to be equally distributed in combined form, may be carried out.

According to the embodiments of the present invention, provided may be playable and educational sports content platform of a virtual target game type, which hits a virtual target by simultaneously throwing, kicking, or hitting a plurality of moving objects with a hand, a foot, or a tool in front of a screen may experience.

Particularly, according to the embodiments of the present invention, by enabling the use of only one infrared camera without using a separate array sensor, positions at which a plurality of moving objects collide with a screen may be precisely recognized in real time.

Moreover, according to the embodiments of the present invention, in addition to positions at which a plurality of moving objects collide with a screen, a current state of each of the moving objects may be traced, thereby providing a user with more information, accuracy, and convenience.

Moreover, according to the embodiments of the present invention, availability and business performance may be good in terms of cost, and in terms of technology, higher accuracy may be provided compared to the related art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A screen collision position recognizing method performed by a screen collision position recognizing system, the screen collision position recognizing method comprising:
    obtaining, by an infrared camera, an image frame when a plurality of moving objects move toward a screen;
    detecting the moving objects from the image frame;
    calculating a collision position of the detected moving objects in the image frame; and
    calculating a collision position of the detected moving objects in the screen on the basis of the calculated collision position of the detected moving objects in the image frame,
    wherein the detecting of the moving objects comprises detecting all moving objects included in a plurality of image frames obtained through photographing performed for a continuous time.

2. The screen collision position recognizing method of claim 1, wherein the detecting of the moving objects comprises generating a graph where a moving object included in a current image frame is connected to a moving object included in a next image frame, based on all of the moving objects included in the plurality of image frames.

3. The screen collision position recognizing method of claim 2, wherein the graph comprises a node set corresponding to a motion position of a moving object included in the image frame and an edge set where moving objects included in an image frame adjacent to the image frame are connected to one another.

4. The screen collision position recognizing method of claim 3, wherein the generating of the graph comprises calculating a value of an edge, representing a connection or not of a node corresponding to a motion position of the moving object included in the current image frame and a node corresponding to a motion position of the moving object included in the next image frame, from the edge set.

5. The screen collision position recognizing method of claim 4, wherein the generating of the graph comprises:
    calculating a cost function which is proportional to a geometric distance between the node of the current frame image and the node of the next frame image and is proportional to a photometric distance between the nodes;
    selecting nodes where the calculated cost function is minimum in a bi-direction in association with a previous image frame and the next image frame with respect to the current image frame; and
    connecting the selected nodes to generate the graph.

6. The screen collision position recognizing method of claim 5, further comprising generating and storing a track list based on the connected nodes,
    wherein the track list comprises a motion position array corresponding to a moving object which is continuously traced from the plurality of image frames, and the motion position array is generated by units of moving objects.

7. The screen collision position recognizing method of claim 1, further comprising tracing a state of a moving object.

8. The screen collision position recognizing method of claim 7, wherein a state of the moving object is determined as one of a stop state, a start state, a forward motion state, a collision state, and a backward motion state of the moving object on the basis of a value of a motion function including a sign and a distance between motion positions of the moving object.

9. The screen collision position recognizing method of claim 8, wherein the calculating of the collision position of the detected moving objects comprises determining, as the collision position, a motion position in the image frame when the state of the moving object is the collision state.

10. The screen collision position recognizing method of claim 8, wherein the calculating of the collision position of the detected moving objects in the screen comprises calculating a collision position in the screen on the basis of a homographic function representing a plane-to-plane projection relationship in the image frame and the screen.

11. The screen collision position recognizing method of claim 8, further comprising, when the state of the moving object is the collision state or the stop state, ending a process of tracing the moving object.

12. A system for recognizing collision positions of a plurality of moving objects in a screen, the system comprising:
- an infrared camera configured to obtain an image frame when the plurality of moving objects move toward a screen;
- a memory configured to store a program for calculating a collision position in the screen on the basis of the image frame; and
- a processor configured to execute the program stored in the memory,
- wherein, by executing the program, the processor detects all of the plurality of moving objects from the image frame to generate a graph where moving objects included in a successive image frame are connected to one another, and calculates a collision position of the moving objects included in the successive image frame and a collision position of the plurality of moving objects in the screen on the basis of the graph.

13. The system of claim 12, wherein the processor calculates a value of an edge, representing a connection or not of nodes corresponding to motion positions of the moving objects included in the successive image frame.

14. The system of claim 13, wherein the processor calculates a cost function which is proportional to a geometric distance between the nodes of the successive frame image and is proportional to a photometric distance between the nodes, selects nodes where the calculated cost function is minimum in a bi-direction in association with the successive image frame, and connects the selected nodes to generate the graph.

15. The system of claim 14, wherein
- the processor generates and stores a track list based on the connected nodes,
- the track list comprises a motion position array corresponding to a moving object which is continuously traced from a plurality of image frames, and
- the motion position array is generated by units of moving objects.

16. The system of claim 12, wherein the processor determines a state of a moving object as one of a stop state, a start state, a forward motion state, a collision state, and a backward motion state of the moving object on the basis of a value of a motion function including a sign and a distance between motion positions of the moving object.

17. The system of claim 16, wherein the processor determines, as the collision position, a motion position in the image frame when the state of the moving object is the collision state and calculates a collision position in the screen on the basis of a homographic function representing a plane-to-plane projection relationship in the image frame and the screen.

* * * * *